United States Patent
Kobori et al.

(10) Patent No.: US 9,816,718 B2
(45) Date of Patent: Nov. 14, 2017

(54) CONTROL DEVICE, AIR CONDITIONING SYSTEM, AND EQUIPMENT SYSTEM

(75) Inventors: Hiroko Kobori, Tokyo (JP); Tomoaki Gyota, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 524 days.

(21) Appl. No.: 14/384,405

(22) PCT Filed: Mar. 14, 2012

(86) PCT No.: PCT/JP2012/056549
§ 371 (c)(1),
(2), (4) Date: Sep. 11, 2014

(87) PCT Pub. No.: WO2013/136465
PCT Pub. Date: Sep. 19, 2013

(65) Prior Publication Data
US 2015/0120003 A1 Apr. 30, 2015

(51) Int. Cl.
*F24F 11/00* (2006.01)
*G05B 15/02* (2006.01)
*F24F 3/06* (2006.01)

(52) U.S. Cl.
CPC .......... *F24F 11/0009* (2013.01); *F24F 3/065* (2013.01); *F24F 11/006* (2013.01); *G05B 15/02* (2013.01); *G05B 2219/2642* (2013.01)

(58) Field of Classification Search
CPC ...... F24F 11/0009; F24F 3/065; F24F 11/006; G05B 15/02; G05B 2219/2642
See application file for complete search history.

(56) References Cited

U.S. PATENT DOCUMENTS 6,085,238 A * 7/2000 Yuasa ................. H04L 12/4641
370/409
7,321,316 B2 * 1/2008 Hancock ................. H04Q 9/00
340/870.02

(Continued)

FOREIGN PATENT DOCUMENTS

EP 1953469 A2 8/2008
JP 06-042800 A 2/1994

(Continued)

OTHER PUBLICATIONS

Extended European Search Report issued Jan. 12, 2016 in the corresponding EP application No. 12871044.9.

(Continued)

*Primary Examiner* — Charles Kasenge
(74) *Attorney, Agent, or Firm* — Posz Law Group, PLC

(57) ABSTRACT

A device control determiner outputs a control information request containing a condition of facility devices in a data possessing device group possessing control information, and a kind of the control information. A connection relationship manager manages information regarding a connection relationship among each of the plurality of facility devices. A connection route database stores information regarding a connection route from a reference device that is a reference among the plurality of facility devices to another facility device. The device grouper creates a data possessing device group based on the control information request, the connection route database and information managed by the connection relationship manager. An information collective obtainer obtains control information from the facility device in the data possessing device group through a communicator, and creates a data array of the obtained control information.

13 Claims, 18 Drawing Sheets

(56) References Cited

U.S. PATENT DOCUMENTS

| | | | |
|---|---|---|---|
| 8,681,754 B2* | 3/2014 | Ishii | H04W 40/12 |
| | | | 370/328 |
| 2003/0070534 A1 | 4/2003 | Ookubo | |
| 2009/0080394 A1* | 3/2009 | Ishii | H04W 40/12 |
| | | | 370/338 |
| 2010/0324962 A1 | 12/2010 | Nesler et al. | |
| 2011/0137853 A1 | 6/2011 | Mackay | |

FOREIGN PATENT DOCUMENTS

| | | |
|---|---|---|
| JP | 2003-122345 A | 4/2003 |
| JP | 2003-185234 A | 7/2003 |
| JP | 2007-322104 A | 12/2007 |
| JP | 2008-281241 A | 11/2008 |
| JP | 2009-008341 A | 1/2009 |
| JP | 2009-299951 A | 12/2009 |

OTHER PUBLICATIONS

International Search Report of the International Searching Authority mailed Jun. 5, 2012 for the corresponding international application No. PCT/JP2012/056549 (with English translation).

* cited by examiner

FIG.3

CONNECTION ROUTE DATABASE

| INPUT | | OUTPUT |
|---|---|---|
| CONNECTION RELATIONSHIP NUMBER | REFERENCE DEVICE ATTRIBUTE | CONNECTION ROUTE ATTRIBUTE ARRAY |
| 0. LOCAL DEVICE | OUTDOOR UNIT | — |
| | INDOOR UNIT | — |
| | REMOTE CONTROLLER | — |
| 1. CLOSEST OUTDOOR UNIT | OUTDOOR UNIT | — |
| | INDOOR UNIT | CONNECTED INDOOR UNIT ID |
| | REMOTE CONTROLLER | CONNECTED INDOOR UNIT ID → CONNECTED OUTDOOR UNIT ID |
| 2. CLOSEST INDOOR UNIT | OUTDOOR UNIT | CONNECTED INDOOR UNIT ID |
| | INDOOR UNIT | — |
| | REMOTE CONTROLLER | CONNECTED INDOOR UNIT ID |
| 3. CLOSEST REMOTE CONTROLLER | OUTDOOR UNIT | CONNECTED INDOOR UNIT ID → CONNECTED REMOTE CONTROLLER ID |
| | INDOOR UNIT | CONNECTED REMOTE CONTROLLER ID |
| | REMOTE CONTROLLER | — |
| 4. SAME ATTRIBUTE CONNECTED TO SAME OUTDOOR UNIT AS LOCAL DEVICE | OUTDOOR UNIT | — |
| | INDOOR UNIT | CONNECTED OUTDOOR UNIT ID → CONNECTED INDOOR UNIT ID |
| | REMOTE CONTROLLER | CONNECTED INDOOR UNIT ID → CONNECTED OUTDOOR UNIT ID → CONNECTED INDOOR UNIT ID → CONNECTED REMOTE CONTROLLER ID |
| 5. SAME ATTRIBUTE CONNECTED TO SAME INDOOR UNIT AS LOCAL DEVICE | OUTDOOR UNIT | CONNECTED INDOOR UNIT ID → CONNECTED OUTDOOR UNIT ID |
| | INDOOR UNIT | — |
| | REMOTE CONTROLLER | CONNECTED INDOOR UNIT ID → CONNECTED REMOTE CONTROLLER ID |
| 6. SAME ATTRIBUTE CONNECTED TO SAME REMOTE CONTROLLER AS LOCAL DEVICE | OUTDOOR UNIT | CONNECTED INDOOR UNIT ID → CONNECTED REMOTE CONTROLLER ID → CONNECTED INDOOR UNIT ID → CONNECTED OUTDOOR UNIT ID |
| | INDOOR UNIT | CONNECTED REMOTE CONTROLLER ID → CONNECTED INDOOR UNIT ID |
| | REMOTE CONTROLLER | — |

FIG.4

DEVICE ATTRIBUTE DATABASE

| DEVICE ID | DEVICE ATTRIBUTE |
|---|---|
| 4a | OUTDOOR UNIT |
| 4b | OUTDOOR UNIT |
| 5a | INDOOR UNIT |
| 5b | INDOOR UNIT |
| 5c | INDOOR UNIT |
| 5d | INDOOR UNIT |
| 6a | REMOTE CONTROLLER |
| 6b | REMOTE CONTROLLER |
| 6c | REMOTE CONTROLLER |

FIG.5

CONNECTION DESTINATION DATABASE

| DEVICE ID | CONNECTION DESTINATION |
|---|---|
| 4a | 1, 5a, 5b, 5c, 5d |
| 4b | 1, 5e, 5f, 5g, 5h |
| 5a | 4a, 6a |
| 5b | 4a, 6b |
| 5c | 4a, 6b |
| 5d | 4a, 6c |
| 6a | 5a |
| 6b | 5b, 5c |
| 6c | 5d |

FIG.6

CONTROL INFORMATION

| INDOOR UNIT ID | SUCTION TEMPERATURE |
|---|---|
| 5a | 25 |
| 5b | 26 |
| 5c | 27 |
| 5d | 28 |

FIG.9

CONTROL INFORMATION REQUEST, INTERMEDIATE DATA, AND FINAL DATA

| CONTROL INFORMATION REQUEST | DATA NAME | CREATED DATA |
|---|---|---|
| | REFERENCE DEVICE ID | 4a |
| | GROUPING CONNECTION KIND | 3. CLOSEST REMOTE CONTROLLER |
| | MAPPING CONNECTION KIND | INDOOR UNIT |
| | DEVICE INFORMATION ID | SUCTION TEMPERATURE |
| CREATED INTERMEDIATE DATA AND FINAL DATA | REFERENCE DEVICE ATTRIBUTE | OUTDOOR UNIT |
| | CONNECTION ROUTE ATTRIBUTE ARRAY | OUTDOOR UNIT→REMOTE CONTROLLER |
| | FIRST DATA MANAGING DEVICE GROUP | {5a, 5b, 5c, 5d} |
| | SECOND DATA MANAGING DEVICE GROUP | {6a, 6b, 6c} |
| | DATA MANAGING DEVICE GROUP | {6a, 6b, 6c} |
| | DATA POSSESSING DEVICE GROUP G1 | {5a} |
| | DATA POSSESSING DEVICE GROUP G2 | {5b, 5c} |
| | DATA POSSESSING DEVICE GROUP G3 | {5d} |
| | MAPPING DATA D1 | {25} |
| | MAPPING DATA D2 | {26, 27} |
| | MAPPING DATA D3 | {28} |
| | MAPPED GROUP CONTROL INFORMATION | {25, 26.5, 28} |

FIG.13

INDOOR UNIT AND REMOTE CONTROLLER CONTROL INFORMATION

| DEVICE DATA KIND | DEVICE ID | DATA |
|---|---|---|
| INDOOR UNIT SUCTION TEMPERATURE | 5a | 25 |
| | 5b | 26 |
| | 5c | 27 |
| | 5d | 28 |
| REMOTE CONTROLLER SET TEMPERATURE | 6a | 25 |
| | 6b | 24 |
| | 6c | 23 |

FIG.14

| DATA NAME | DATA | DATA CONTENT |
|---|---|---|
| FIRST CONTROL INFORMATION D1 | {25, 26, 27, 28} | SUCTION TEMPERATURE OF INDOOR UNIT |
| FIRST DATA POSSESSING DEVICE GROUP G1 | {5a, 5b, 5c, 5d} | DEVICE POSSESSING DATA of D1 |
| SECOND CONTROL INFORMATION D2 | {24, 23, 25} | SET TEMPERATURE OF REMOTE CONTROLLER |
| SECOND DATA POSSESSING DEVICE GROUP G2 | {6a, 6b, 6c} | DEVICE POSSESSING DATA of D2 |
| CONNECTION RELATIONSHIP KIND | 2. CLOSEST INDOOR UNIT | CONNECTION RELATIONSHIP FROM G2 TO G1 |
| NUMERICAL OPERATION INSTRUCTION | D1-D2 | OPERATION INSTRUCTION FROM DEVICE CONTROL DETERMINER |
| CONNECTION DEVICE GROUP G3 | {5a} | DEVICE GROUP SATISFYING CONNECTION RELATIONSHIP WHEN REFERENCE DEVICE IS 6a |
| CONNECTION DEVICE GROUP G4 | {5b, 5c} | DEVICE GROUP SATISFYING CONNECTION RELATIONSHIP WHEN REFERENCE DEVICE IS 6b |
| REFORMED DEVICE INFORMATION SET D3 | {24, 23, 23, 25} | DATA OBTAINED WHEN D2 IS REFORMED IN FORMAT OF G1 |
| OPERATION RESULT D4 | {1, 3, 4, 3} | OPERATION RESULT UTILIZING REFORMED DEVICE INFORMATION SET TO NUMERICAL OPERATION INSTRUCTION |

Rows grouped as: DATA IN NUMERICAL OPERATION INSTRUCTION (first six rows) | INTERMEDIATE DATA AND REFORMED DATA (last four rows)

FIG.16

INSTALLATION LOCATION DATABASE

| DEVICE ID | INSTALLATION ROOM ID | INSTALLATION AREA NUMBER |
|---|---|---|
| 5a | 101 | 1 |
| 5b | 102 | 1 |
| 5c | 102 | 2 |
| 5d | 103 | 1 |
| 6a | 101 | 1 |
| 6b | 102 | 2 |
| 6c | 103 | 1 |

FIG.18

INSTALLATION RELATIONSHIP DATABASE

| INSTALLATION RELATIONSHIP NUMBER | INSTALLATION RELATIONSHIP NUMBER | INSTALLATION RELATED ROUTE |
|---|---|---|
| 100 | INDOOR UNIT IN SAME INSTALLATION ROOM | INSTALLATION ROOM ID → INDOOR UNIT ID IN ROOM |
| 101 | REMOTE CONTROLLER IN SAME INSTALLATION ROOM | INSTALLATION ROOM ID → REMOTE CONTROLLER ID IN ROOM |
| 102 | INDOOR UNIT IN SAME INSTALLATION AREA | INSTALLATION ROOM ID → INSTALLATION AREA ID → INDOOR UNIT IN ROOM |
| 103 | REMOTE CONTROLLER IN SAME INSTALLATION AREA | INSTALLATION ROOM ID → INSTALLATION AREA ID → REMOTE CONTROLLER ID IN ROOM |

CONTROL DEVICE, AIR CONDITIONING SYSTEM, AND EQUIPMENT SYSTEM

CROSS REFERENCE TO RELATED APPLICATION

This application is a U.S. national stage application of International Application No. PCT/JP2012/056549 filed on Mar. 14, 2012, the disclosure of which is incorporated herein by reference.

TECHNICAL FIELD

The present disclosure relates to a control device, an air conditioning system and an equipment system.

BACKGROUND ART

Conventionally, air conditioning systems having multiple air conditioners and a control device thereof connected via a general-purpose network are sometimes installed in large-scale buildings, such as a retail store or an office building. The control device controls the multiple air conditioners in accordance with a preset algorithm. It is disclosed that a system controls indoor device (indoor units) divided into multiple groups beforehand, group by group in order to control the multiple indoor device (indoor units) in a building with minimal operation (see, for example, Patent Literatures 1 and 2).

Moreover, a central managing system that collectively control the multiple air conditioners is required to comprehend the system linkage of the air conditioners. Hence, a central managing system that automatically recognizes a system linkage is disclosed (see, for example, Patent Literature 3).

CITATION LIST

Patent Literature

Patent Literature 1: Unexamined Japanese Patent Application Kokai Publication No 2003-185234
Patent Literature 2: Unexamined Japanese Patent Application Kokai Publication No. 2009-299951
Patent Literature 3: Unexamined Japanese Patent Application Kokai Publication No. 2003-122345

SUMMARY OF INVENTION

Technical Problem in a retail store or an office building, there are needs to install an energy-saving algorithm in the control device to reduce the electricity charges, and to change a grouping of the air conditioners or the control algorithm flexibly and easily in accordance with changes of a layout and so on.

According to the conventional control devices, however, a grouping registration of the facility devices of the air conditioner and the like is manually carried out. Hence, a large workload is required to modify an air conditioner group to a group more suitable to a situation (for example, better comforts and energy-saving performance).

The present disclosure has been made in view of the aforementioned circumstances, and it is an objective to provide a control device that enables automatic and flexible grouping of facility devices.

Solution to Problem

To accomplish the above objective, a control device according to the present disclosure controls a plurality of facility devices, and the control device includes: a communicator that receives control information from each of the plurality of facility devices; a control determiner that outputs a control information request for collectively obtaining pieces of the control information of the plurality of facility devices in accordance with a predetermined control algorithm, the control information request containing a condition of the facility devices to be included in a possessing device group possessing the control information to be obtained, and a kind of the control information to be obtained; a connection relationship manager that manages information on a connection relationship among the plurality of facility devices; a connection route database that stores information on a connection route from a reference device in the plurality of facility devices to another facility device; a device grouper that creates the possessing device group based on the connection route database and information managed by the connection relationship manager in accordance with a group creation instruction based on the control information request; and an information collective obtainer that obtains the control information of the facility device in the possessing device group through the communicator, and that creates a data array of the obtained control information.

Advantageous Effects of Invention

According to the present disclosure, with reference to information managed by the connection route database that stores information on a connection route from a reference device to another facility device, and by the connection relationship manager based on a condition of the facility device in the possessing device group that possesses control information in the control algorithm based on the connection relationship of the facility device and the kind of the control information to be obtained, and the like, a group of facility devices that automatically and collectively obtain the control information is created. According to this configuration, grouping of the facility devices can be automatically flexibly carried out without manual setting of the group.

BRIEF DESCRIPTION OF DRAWINGS

FIG. 3 is a table illustrating an example of structure of a connection route database;
FIG. 4 is a table illustrating an example of structure of a device attribute database;
FIG. 5 is a table illustrating an example of structure of a connection destination database;
FIG. 6 is a table illustrating an example of control information to an indoor unit;
FIG. 9 is a table illustrating an example of control information request, intermediate data, and final data;

FIG. 13 is an example of control information;

FIG. 14 is a table illustrating an example of data in a numerical calculation instruction, intermediate data, and formed data;

FIG. 16 is a table illustrating an example of data registered in an installation location database;

FIG. 18 is a table illustrating an example of data registered in an installation relation database.

DESCRIPTION OF EMBODIMENTS

Embodiments of the present disclosure will be explained in detail with reference to the accompanying drawings.

First Embodiment

First of all, an explanation will be given of a first embodiment of the present disclosure.

Figure 1:
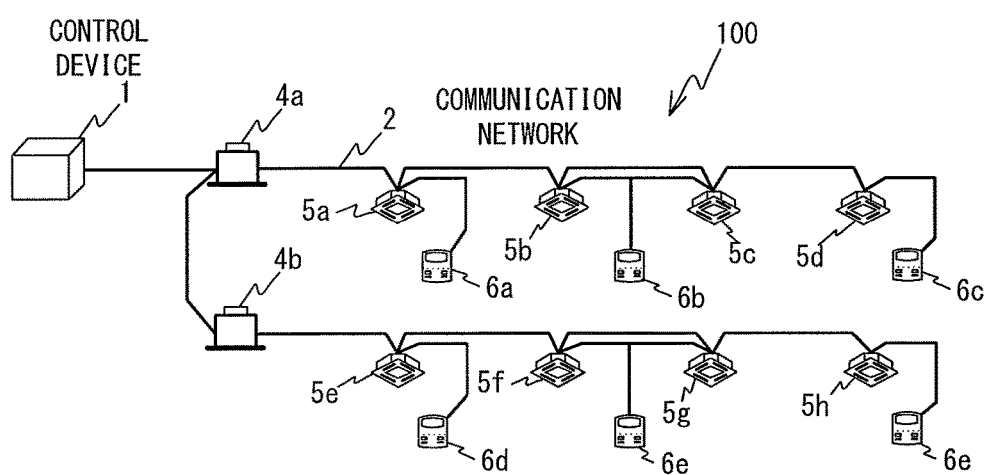
FIG. 1 is an example of diagram illustrating a general configuration of an air conditioning system according to a first embodiment of the present disclosure.

FIG. 1 illustrates a general configuration of an air conditioning system 100 according to the first embodiment. As illustrated in FIG. 1, the air conditioning system 100 includes a control device 1 that controls multiple air conditioners which are facility devices. The control device 1 is connected with the multiple facility devices, that is, air conditioners via a communication network 2.

Equal to or greater than one outdoor unit, indoor unit, and remote controller, respectively, as air conditioners are connected to communication network 2. In FIG. 1, outdoor units 4a, 4b, indoor units 5a, 5b, 5c, 5d, 5e, 5f, 5g, and 5h, and, remote controller 6a, 6b, 6c, 6d, 6e, and 6f are connected to the communication network 2. Some air conditioning systems have a diverging controller between the indoor unit and the outdoor unit, but it is presumed that no diverging controller is provided in this embodiment.

Each of the remote controllers 6a to 6f is connected to one or more indoor unit. In addition, a central managing controller that is a master remote controller collectively controlling all remote controllers 6a to 6f may be provided in some cases, but it is presumed that no central managing controller is provided in this embodiment.

Figure 2:
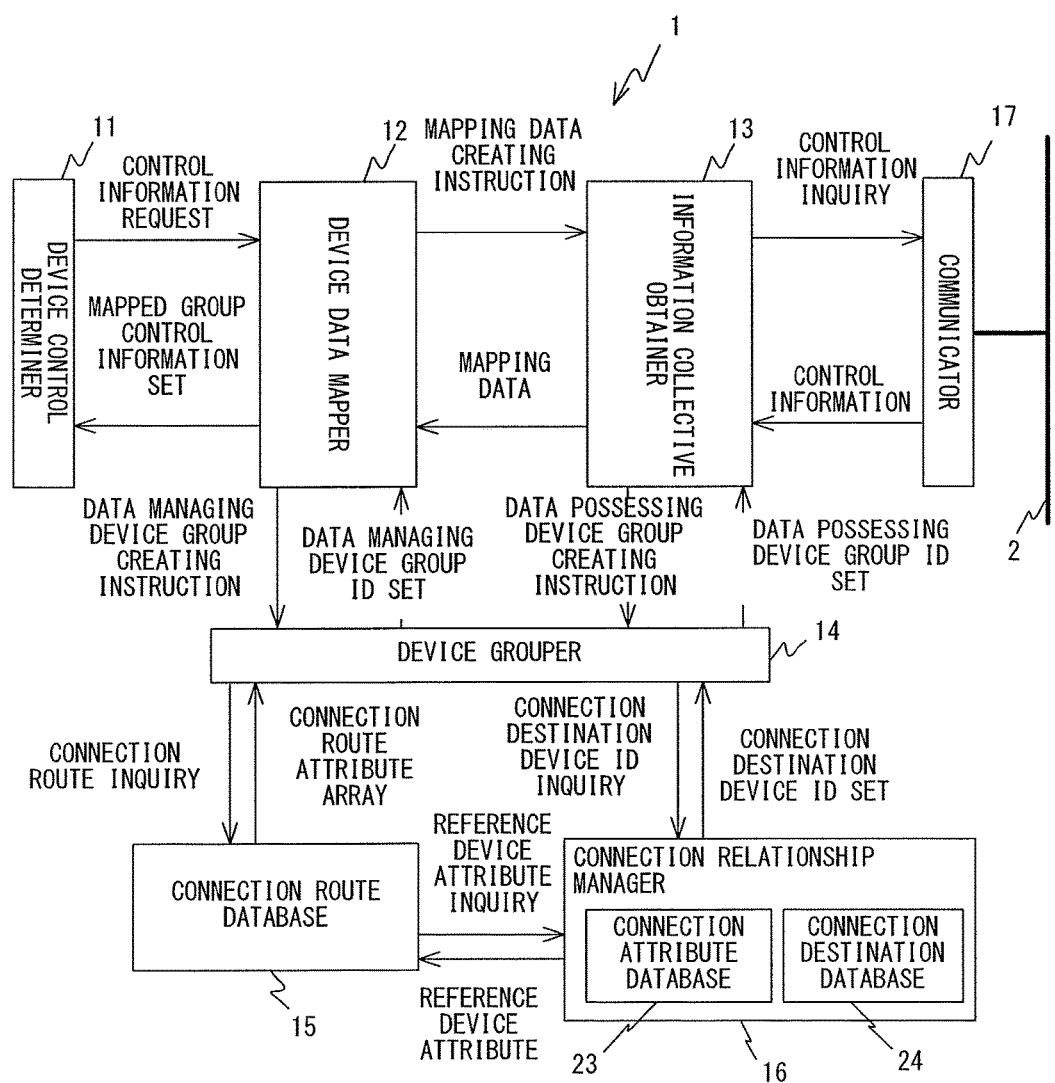
FIG. 2 is a block diagram illustrating a detailed configuration of a control device according to the first embodiment of the present disclosure.

FIG. 2 illustrates a detailed configuration of the control device 1. The control device 1 is a computer that can communicate via the communication network 2. When the processor of the computer executes a program stored in a memory, the following functions are realized.

As illustrated in FIG. 2, the control device 1 includes a device control determiner 11, a device data mapper 12, an information collective obtainer 13, a device grouper 14, a connection route database 15, a connection relationship manager 16, and a communicator 17.

The device control determiner 11 decides the control content to each facility device (outdoor unit or indoor unit). The device control determiner 11 is implemented with a program that runs in accordance with a predetermined control algorithm. This program can be updated through an external inputting using a personal computer or the like. The control algorithm can be updated upon this updating.

More specifically, the device control determiner 11 outputs a control information request to collectively obtain control information of the each facility devices in accordance with the executed control algorithm. More specifically, the device control determiner 11 outputs a control information request containing the condition of the facility device in a data managing device group that is a management target, the condition of the facility device in a data possessing device group having control information to be obtained, and the kind of the control information to be obtained.

The data managing device group is a group of devices to be managed actually, and is a device group having a number of array elements of data and an arrangement of respective elements decided when data is obtained. The data possessing device group is a device group having data to be obtained actually.

The device control determiner 11 eventually obtains the control information in a format in accordance with a control algorithm, that is, information having undergone mapping for each grouped device that is a management target. This obtained information is referred to as a mapped group control information set.

In addition, the device control determiner 11 transmits a control instruction containing a device ID and a control information kind to the communicator 17 in accordance with the decided control content.

The connection route database 15 stores information on a connection route from a reference device that is a reference among the multiple facility devices to another facility device. That is, the connection route database 15 stores a connection route indicating a route that should be traced when a device group satisfying a specified connection relationship with the reference device is created. The connection route is information indicating through which route between the reference device and the device t connected therewith information can be transmitted.

An explanation will now be given of the structure of the connection route database 15. FIG. 3 illustrates an example of data registered in the connection route database 15. As illustrated in FIG. 3, the connection route database 15 registers, in association with each other, a connection relationship number, a reference device attribute, and a connection route attribute array.

The connection relationship number is an identification number allocated in accordance with a connection relationship. The connection relationship is specified and data is managed based on the connection relationship number. In this embodiment, the connection relationship number corresponds to a condition on a connection relationship.

The reference device attribute is information indicating the attributes of the reference device, that is, the kind of the reference device. Namely, the attributes represents the kind of device, such as "outdoor unit" and "remote controller".

The connection route attribute array is an array indicating a sequence of the attributes from the reference device to the facility device indicated by the connection relationship number.

The connection route database 15 outputs, when, as a connection route inquiry, the connection relationship number (a condition of a group belonging to the connection relationship) and the reference device attribute are input therein, a corresponding connection route attribute array (a sequence of the attributes of facility devices). As will be discussed later, the device grouper 14 traces the sequence of the attributes in the connection route obtained from the connection route database 15, thereby specifying the facility devices in the data managing device group and the data possessing device group.

In this case, an explanation will be given of, as an example, a connection route from the outdoor unit to the remote controller. A route from the outdoor unit to the closest remote controller is through an indoor unit connected to the outdoor unit and reaches the remote controller connected with that indoor unit. In this case, a connection relationship number that is 3, the closest remote controller, and the outdoor unit that is a reference device attribute are input, and the connection route database 15 outputs an attribute array that is from connected indoor unit ID to connected remote controller ID.

The connection among the devices is often a not one-to-one connection. Every time the connection route is traced, the number of devices obtained as a search result increases or decreases. In addition, in the table in FIG. 3, when it is entered as "-", this means that the device indicated as the connection route is consistent with the reference device, and thus tracing of the connection route is unnecessary.

The connection relationship manager 16 manages information regarding which device each facility device is connected to, that is, information on respective connection relationships of the multiple facility devices. More specifically, the connection relationship manager 16 includes a device attribute database 23, and a connection destination database 24.

An explanation will now be given of the structure of the device attribute database 23. FIG. 4 illustrates an example of data registered in the device attribute database 23. As illustrated in FIG. 4, the device attribute database 23 registers a device ID of an facility device and a device attribute in association with each other. In the following explanation, in order to simplify the explanation, it is presumed that a reference numeral given to each facility device is a device ID.

Next, an explanation will be given of the structure of the connection destination database 24. FIG. 5 illustrates an example of data registered in the connection destination database 24. As illustrated in FIG. 5, the connection destination database 24 registers the device ID of the facility device (an attribute of the facility device) and the device ID (attribute) of the facility device that is a connection destination to which the former facility device is directly connected.

The connection relationship manager 16 refers to the device attribute database 23 when receiving an inquiry for the reference device attribute including the device ID, and replies with the reference device attribute. In addition, the connection relationship manager 16 refers to the connection destination database 24 when receiving an inquiry for the connection destination device ID including the device ID from the device grouper 14 or the like, and replies with a device ID set (attribute) of the facility device to which the facility device transmitting the inquiry is directly connected. As will be discussed later, the device grouper 14 traces the sequence of attributes in the connection route based on the attribute of the facility device sent in reply by the connection relationship manager 16.

The device grouper 14 groups the air conditioners. More specifically, the device grouper 14 creates, in accordance with data-managing device-group creating instructions that are output by the device data mapper 12 in accordance with a control information request that is output by the device control determiner 11, a data managing device group based on the connection route database 15 and information managed by the connection relationship manger 16, and replies with a data managing device group ID set. In addition, the device grouper 14 creates, in accordance with a data-possessing device-group creating instructions that are output by the information collective obtainer 13 in accordance with the control information request output by the device control determiner 11, a data managing device group based on the connection route database 15 and information managed by the connection relationship manager 16, and replies a data possessing device group ID set.

The data managing device group creating instruction and the data possessing device group creating instruction have the identification ID of a device (hereinafter, referred to as a "reference device") that is a reference for a connection, and the way of connection (connection relationship) between the reference device, a refrigerant pipe, a network, and a power line specified. In addition, the data managing device group ID set and the data possessing device group ID set are each a grouped ID set (data managing device ID) of the facility devices satisfying the connection relationship.

The information collective obtainer 13 obtains the control information from the facility device in the data possessing device group via the communicator 17, and creates a data array of the obtained control information. More specifically, the information collective obtainer 13 transmits the data possessing device group creating instruction to the device grouper 14 when receiving a mapping data creation instruction, and receives the data possessing device group ID set from the device grouper 14. The information collective obtainer 13 obtains the control information from each facility device in the data possessing device group ID set via the communicator 17, creates a data array of the control information, and sends a reply such a data array as mapping data to the device data mapper 12.

The device data mapper 12 transmits the data managing device group creating instruction to the device grouper 14 in accordance with the control information request transmitted from the device control determiner 11, and receives the data managing device group ID set. The device data mapper 12 transmits, to the information collective obtainer 13, the condition of the facility device in the data possessing device group possessing the control information to be obtained and contained in the control information request transmitted by the device control determiner 11, and the mapping data creating instruction containing the data managing device group ID set obtained from the device grouper 14, and receives the mapping data from the information collective obtainer 13. The device data mapper 12 allocates the element of the mapping data obtained from the information collective obtainer 13 to the facility device contained in the data managing device group, and replies, as a mapped group control information set, to the device control determiner 11.

The communicator 17 communicates with each air conditioner through the communication network 2 in accordance with the control information inquiry. More specifically, the communicator 17 receives the control information in accordance with the control information inquiry from each air conditioner. The communicator 17 interprets a command when communicating with the air conditioner through the communication network 2, and converts an instruction to the air conditioner into a command. When the device ID and the control information kind are transmitted, the communicator 17 receives the control information of the specified device upon inquiry to the air conditioner.

The communicator 17 transmits a control instruction to each of the multiple facility devices. More specifically, when receiving the control instruction containing the device ID and the control information kind from the control content determiner 11, the communicator 17 transmits, to the air conditioner, the control instruction to control that air conditioner corresponding to the device ID.

Next, an explanation will be given of an operation of the air conditioner control device according to this embodiment.

Figure 7:
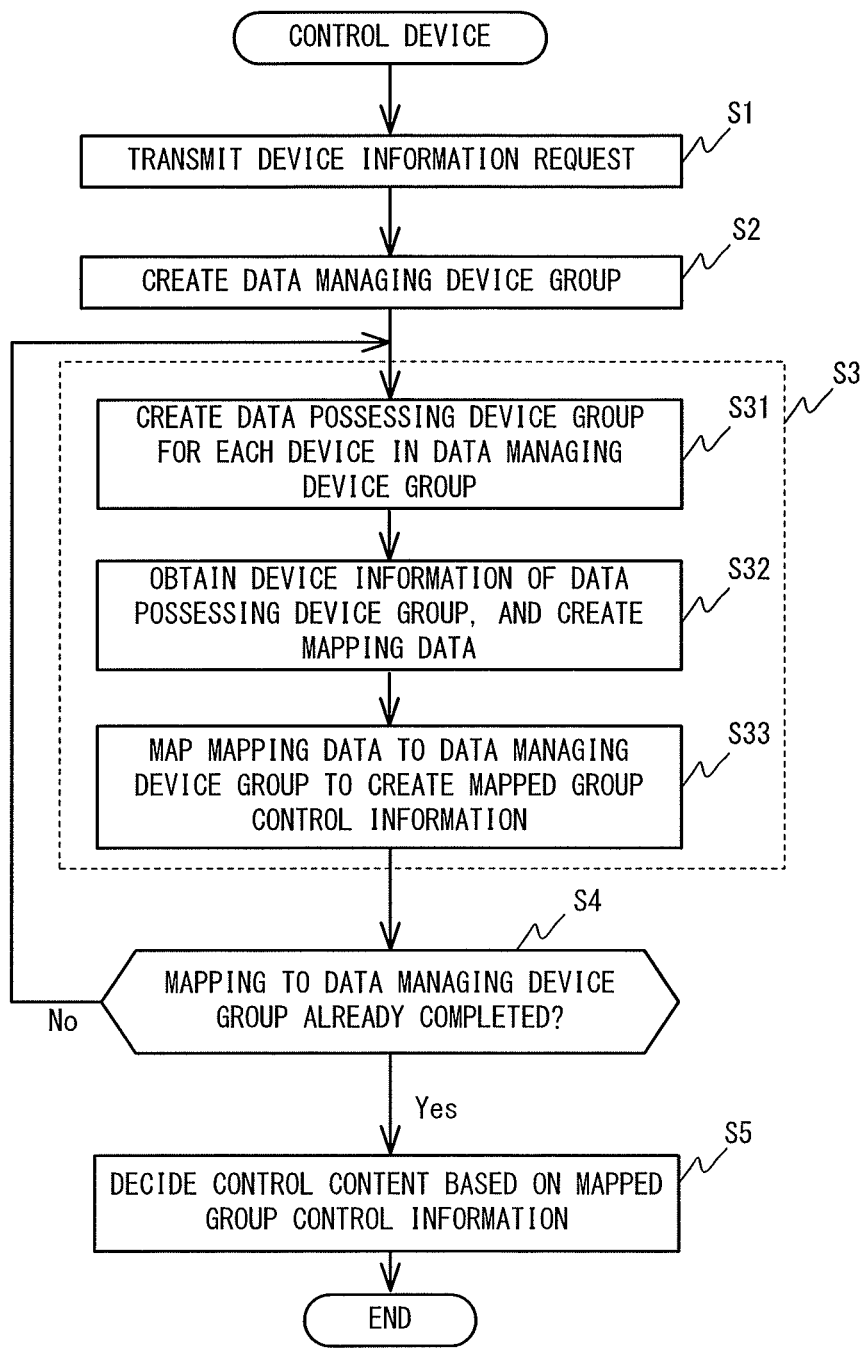
FIG. 7 is a flowchart illustrating an operation of the control device.

FIG. 7 illustrates an operation of the control device 1.

First, as illustrated in FIG. 7, the device control determiner 11 transmits the control information request to the data mapper 12 (step S1).

Next, the device grouper 14 receives, from the device data mapper 12, the data managing device group creating instruction based on the control information request output by the device control determiner 11, and creates the data managing device group (step S2).

Subsequently, the control device 1 maps the control information of a different device onto the created data managing device group (step S3). Hence, the control information of a given device can be obtained as if it is the control information of the different device.

More specifically, the device grouper 14 creates the data possessing device group for each device in the data managing device group (step S31). Next, the information collective obtainer 13 obtains the device information of the data possessing device group, and creates mapping data (step S32). Subsequently, the device data mapper 12 maps the mapping data onto the data managing device group to create mapped group control information (step S32).

Next, the control device 1 determines whether or not mapping to all data managing device group has completed (step S4). When the mapping has not completed yet (step S4; No), the control device 1 repeats the steps S31→S32→S33. When the mapping has completed (step S4; Yes), the device control determiner 11 decides the content of control based on the mapped group control information (step S5). The control device 1 ends the process after the execution of the step S5.

Figure 8:
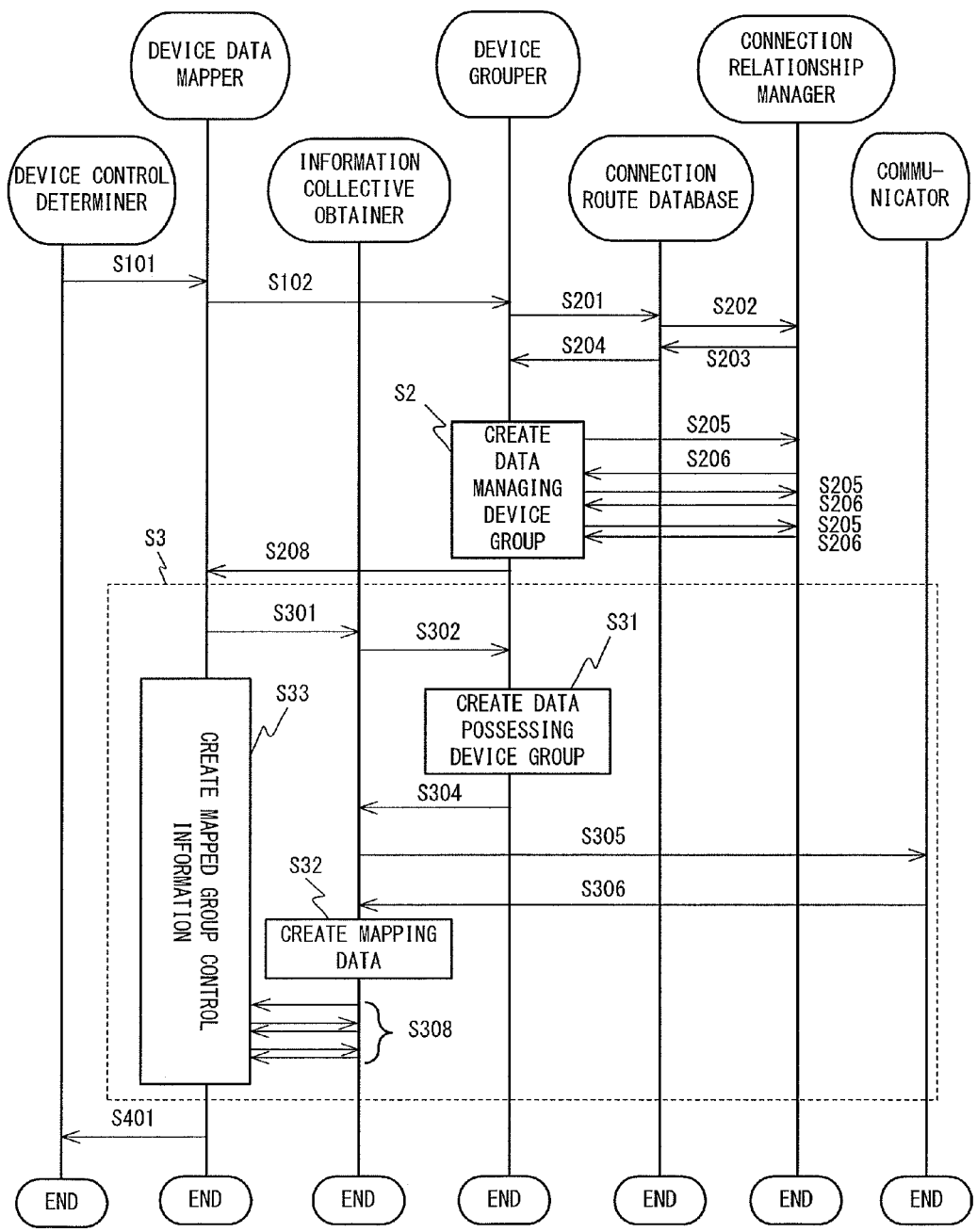
FIG. 8 is a sequence diagram illustrating an operation of the control device.

A detail of the mapping operation of the control device will be explained with reference to FIG. 8. In this example, mapping of the control information in the air conditioning system 100 in FIG. 1 will be explained in detail as well as the mapping operation. According to the air conditioning system 100 in FIG. 1, the indoor units 5a to 5d are connected with the outdoor unit 4a. The remote controller 6a is connected with the indoor unit 5a, the remote controller 6b is connected with the indoor units 5b and 5c, and the remote controller 6c is connected with the indoor unit 5d. the control device 1 is connected to the outdoor unit 4a through the network 2.

In the following explanation, a case in which the suctioning temperatures of the indoor units 5a, 5b, 5c, and 5d in the system of the outdoor unit 4a are obtained as data of the remote controllers 6a, 6b, and 6c in the same system in accordance with a control algorithm will be taken into consideration. FIG. 6 illustrates the suctioning temperatures (control information) of the respective indoor units 5a, 5b, 5c, and 5d at this time.

Moreover, FIG. 9 illustrates final data and intermediate data created in addition to the content of the control information request transmitted from the device control determiner 11. The intermediate data illustrated in FIG. 9 is data exchanged between respective blocks in the control device 1 in FIG. 2.

First, the device control determiner 11 transmits the control information request to the device data mapper 12 (step S101). As illustrated in FIG. 9, this control information request includes a reference device ID, a grouping connection kind, a mapping connection kind, and a control information ID.

The reference device ID is the ID of the device that will be a reference point of a connection route when the data managing device group is created. The grouping connection kind is a connection relationship number indicating the connection relationship between the reference device and the data managing device group. The mapping connection kind is a connection relationship number indicating the connection relationship between the data managing device group and the data possessing device group. The control information ID is an ID indicating a kind of control information which is obtained from the data possessing device group.

As explained above, when the suctioning temperatures of the indoor units 5a, 5b, 5c, and 5d in the system of the outdoor unit 4a are obtained as data of the remote controllers 6a, 6b, and 6c in the same system, the reference device is the outdoor unit 4a, the data managing device group is the closest remote controller, the mapping connection kind is the closest indoor unit, and the control information ID is the suctioning temperature. That is, in this case, as illustrated in FIG. 9, the reference device ID=4a, the grouping connection kind=3. the closest remote controller, mapping connection kind=2. the closest indoor unit, and control information ID=suctioning temperature.

The device data mapper 12 that has received the control information request transmits the data managing device group creating instruction to the device grouper 14 to obtain the data managing device group (step S102). The data managing device group creating instruction includes, in the received control information request, the reference device ID and the grouping connection kind.

The device grouper 14 that has received the data managing device group creating instruction transmits a connection route inquiry to the connection route database 15 to obtain the connection route from the reference device to the data managing device group (step S201). Like the data managing device group creating instruction, the connection route inquiry includes the reference device ID and the grouping connection kind.

The connection route database 15 that has received the connection route inquiry transmits a reference device attribute inquiry to the connection relationship manager 16 to obtain the attribute of the reference device (step S202).

The connection relationship manager 16 searches the reference device attribute corresponding to the received reference device ID from the device attribute database 23, and transmits a reference device attribute response that is a search result to the connection route database 15 (step S203). In this case, as illustrated in FIG. 9, the reference device attribute is the outdoor unit.

Next, the connection route database 15 that has received the reference device attribute response from the connection relationship manager 16 searches the connection route corresponding to the obtained reference device attribute and the grouping connection kind, and replies a grouping connection route that is a search result to the device grouper 14 (step S204). As illustrated in FIG. 9, the grouping connection route (connection route attribute array) is [indoor unit→remote controller]. At this time, when the connection route is returned as [0. local device], the device grouper 14 replies the reference device ID itself as the information managing device group.

Subsequently, the device grouper 14 creates a data managing device group while inquiring the connection destination of the device to the connection relationship manager 16 through the grouping connection route (step S2).

First, the device grouper 14 transmits a connection destination device ID inquiry to the connection relationship manager 16 (step S205). In this inquiry, the device with the first attribute in the grouping connection route is inquired among the devices connected with the reference device. The connection relationship manager 16 that has received the connection destination device ID inquiry creates a first data managing device group, and transmits the created group information to the device grouper 14 (step S206). In this case, the device group created through the process of creating the data managing device group will be referred to as a first data managing device group. In this case, as illustrated in FIG. 9, the first data managing device group is {5a, 5b, 5c, 5d}.

Next, the device grouper 14 and the connection relationship manager 16 executes the processes in the steps S205 and S206 to the first data managing device group, thereby creating a second data managing device group. Thus, the steps S205 and S206 are repeated by the number of elements of the attribute array of the connection route. The processes in the steps S205 and S206 are executed on all elements of the attribute array of the connection route to create the second data managing device group. In this case, as illustrated in FIG. 9, the data managing device group is {6a, 6b, 6c}.

The created data managing device group may contain a redundant element. In such a case, one redundant element is left, but the other elements are eliminated from the array. In this case, when remote controllers connected to respective ones in the indoor unit group {5a, 5b, 5c, 5d} are obtained, such a remote controller group becomes {6a, 6b, 6b, 6c}. In such a case, the device grouper 14 eliminates a redundant element 6b, and changes the remote controller group to be {6a, 6b, 6c}.

Eventually, the device grouper 14 transmits the data managing device group ID set to the device data mapper 12 (step S208).

Next, the device data mapper 12 creates a data possessing device group for each device in the received data managing device group, obtains control information, and maps such information onto the data managing device group (step S3).

First, the device data mapper 12 transmits a mapping data creating instruction for the first device in the data managing device group to the information collective obtainer 13 (step S301). The mapping data is control information for the data possessing device group corresponding to each device in the data managing device group. The first mapping data creating instruction contains the device ID of the first device in the data managing device group, the mapping connection kind, and the control information ID. In this case, the device ID=6a, the mapping connection kind=2. the closest remote controller, and the control information ID=suctioning temperature.

Subsequently, the information collective obtainer 13 transmits a data possessing device group creating instruction to the device grouper 14 (step S302). The data possessing device group creating instruction contains the device ID in the mapping data creating instruction and the mapping connection kind. In this case, the device ID=6a, and the mapping connection kind=2. the closest remote controller.

Next, the device grouper 14 creates a data possessing device group (step S31) through the same scheme as that of the data managing device group (step S2), and transmits the created group to the information collective obtainer 13 (step S304). In this case, a data possessing device group G1 to the indoor unit 6a is {5a}.

Thereafter, the information collective obtainer 13 transmits a control information inquiry to the communicator 17 to obtain control information on each device in the received data possessing device group (step S305). In response to this inquiry, the communicator 17 inquires the control information to the facility device, obtains the control information, and transmits the control information as a reply to the information collective obtainer 13 (step S306). The control information and the device ID correspond to each other one on one, and thus the number of data of reply of control information to one control information inquiry is one.

Subsequently, the information collective obtainer 13 that has obtained device data of all devices in the data possessing device group collects up the device data in an array, thereby creating mapping data (step S32). The information collective obtainer 13 transmits the mapping data to the device data mapper 12 (step S308). In this case, as illustrated in FIG. 9, mapping data D1 to the data possessing device group G1 is {25}.

Next, the device data mapper 12 that has received the mapping data maps the mapping data onto the device in the data managing device group, thereby creating mapped group control information (step S33). Note that mapping means an allocation of information on a device set to another device.

An explanation will now be given of an example case in which the number of elements in the mapping data is equal to or greater than two. When the mapping data has an array including equal to or greater than two elements, the device data mapper 12 obtains an average of the numeric values of all elements in the mapping data. In this case, as illustrated in FIG. 9, a data possessing device group G2 relative to the device 6b in the data managing device group G1 is {5a, 5b}. Hence, mapping data D2 becomes {26, 27}. Therefore, the device data mapper 12 maps {26.5} that is an average of the mapping data D2 onto the remote controller 6b.

The device data mapper 12 repeats the process in the step S3 by the number of devices in the data managing device group, and creates mapped group control information. As illustrated in FIG. 9, the final mapped control information becomes {25, 26.5, 28}.

Next, the device data mapper 12 transmits the mapped group control information created by aforementioned processes, to the device control determiner 11 (step S401).

The device control determiner 11 that has received the mapped group control information decides the control content for the device through, for example, a numerical calculation based on the obtained mapped group control information. The following is an example of algorithm utilizing the obtained mapped group control information.

The obtained mapped group control information is data including the suctioning temperature of the indoor unit mapped on the remote controller. The device control determiner 11 obtains a difference from data on the set temperature of the remote controller, takes the maximum value of the difference to calculate a necessary power of the air conditioner at this time, and decides the frequency of the outdoor unit that is the reference device.

Subsequently, the device control determiner 11 transmits the device control instruction decided based on the control algorithm to the communicator 17. The communicator 17 converts the control instruction into a command for controlling the air conditioner, and transmits such a command to the air conditioner. Hence, the air conditioner is operated.

As explained above in detail, according to this embodiment, the group of facility devices is automatically created based on the condition of the facility device in the possessing device group possessing control information to be obtained, the kind of the control information to be obtained, and the like, in accordance with the control algorithm on the basis of the connection relationship of the facility devices. According to this scheme, it becomes unnecessary to manually set a group, but grouping of the devices in a format suitable for the control algorithm can be automatically and flexibly carried out. As a result, description and setting of the control algorithm corresponding to a situation more properly (for example, better comforts and energy-saving performance) are facilitated.

In addition, according to this embodiment, the reference device and the connection relationship therewith are specified to trace the connection between the devices at the system's end, thereby automatically creating a device group. Accordingly, even if the device ID of the air conditioner is assigned irregularly or the device ID is spatially infrequent, a device group can be specified with a certain amount of work. Still further, in comparison with a case in which a device group is manually set, incompletion of the setting and an error thereof can be avoided.

Moreover, when the control algorithm of the air conditioner is set, a comparative calculation of information of two different device groups is applied in some cases. Information on respective device groups has difference in the number of elements in an array and the meaning of each element. However, according to this embodiment, information on one device group is reformed as information on another device group, and thus two kinds of information can be handled as information having a consistency in the number of elements and meaning. As a result, it becomes sufficient if a numerical calculation in the control algorithm is set as a calculation for respective simple arrays, and thus the setting for the control algorithm becomes simple and facilitated.

Furthermore, when the number of elements in the mapping data (the number of control information) is equal to or greater than two, an average is obtained in this embodiment, but a representative value, such as a maximum value, a minimum value, or an intermediate value, or, a calculated value based on a predetermined calculation may be utilized. In addition, when the control information of one device is mapped on equal to or greater than two devices, a piece of data may be copied and allocated to multiple devices, or divided into multiple pieces and then allocated to the multiple devices. When an appropriate numerical value to be allocated is selected, the amount of description in the setting for the control algorithm can be reduced, thereby reducing the work time.

Note that the registered content in the connection route database 15 is steady in this embodiment, but information on the connection route of an arbitrary connection relationship through an external input like a PC may be added or modified. In this case, information input to the connection route database 15 is a combination of a connection relationship number, a reference device attribute, and a connection route attribute array. Hence, a necessary connection route for setting the control algorithm in accordance with a site where the air conditioner is utilized can be added as needed, enabling a flexible setting for the control algorithm.

In addition, according to this embodiment, the control device 1 stores and retains the connection information of all devices and the device kinds thereof in the connection destination database 24 and the device attribute database 23. However, an inquiry to the facility device can be made as needed to obtain such information, or a result of an inquiry may be stored in the connection destination database 24 and the device attribute database 23, and every time information not stored becomes necessary, an inquiry for such information may be made to the facility device.

When, as the mapping connection kind, {0. local device} is specified, no mapping of data may be performed, control information on a data managing device group may be obtained through the information collective obtainer 13, and the obtained information may be transmitted to the device control determiner 11. When such data becomes necessary, the device control determiner 11 may be directly obtain the control information on the device from the information collective obtainer 13 not through the device data mapper 12.

According to this embodiment, the device grouper 14 automatically performs device grouping based on the connection relationship of the devices. However, a database that can obtain a connection route based on the reference device and the connection relationship with other facility devices may be created manually.

According to this embodiment, basically, the facility devices are grouped based on the connection relationship over the communication network 2, but the facility devices may be grouped based on a connection relationship through a refrigerant pipe or a power line.

Second Embodiment

Next, an explanation will be given of a second embodiment of the present disclosure.

Figure 10:
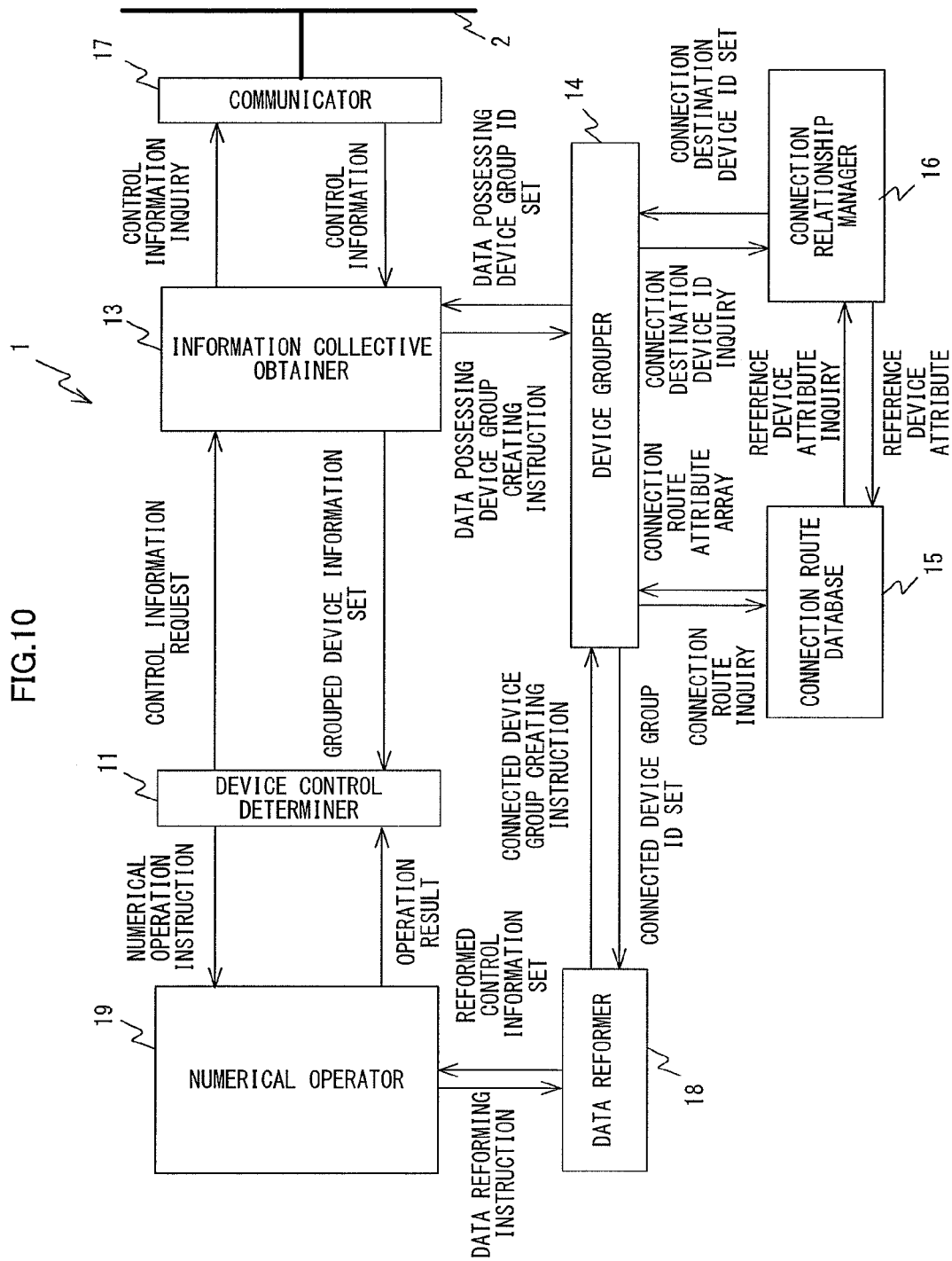
FIG. 10 is a block diagram illustrating a detailed configuration of a control device, according to a second embodiment of the present disclosure.

FIG. 10 illustrates a configuration of the control device 1 according to this embodiment. As illustrated in FIG. 10, as to the control device 1, the device control determiner 11, the information collective obtainer 13, the device grouper 14, the communicator 17, the connection route database 15, and the connection relationship manager 16 are the same as those of the first embodiment.

According to this embodiment, however, no device data mapper 12 is provided. A control information request from the device control determiner 11 is transmitted to the information collective obtainer 13, and a group control information set from the information collective obtainer 13 is transmitted to the device control determiner 11. That is, according to this embodiment, no data managing device group is created, but only the data possessing device group is created.

The control device 1 of this embodiment further includes a numerical operator 19, and a data reformer 18.

The numerical operator 19 performs a numerical operation in accordance with a numerical operation instruction received from the device control determiner 11. The numerical operation instruction contains control information on two different device groups, a connection relationship between the two grouped devices, and an operation instruction. The numerical operator 19 performs a numerical operation based on the two different control information and the operation instruction, and replies an operation result to the device control determiner 11.

The data reformer 18 receives a data reforming instruction from the numerical operator 19. The data reforming instruction contains, in the numerical operation instruction, control information on two different device groups, two device groups, and a connection relationship between the two grouped devices (connection relationship kind). The data reformer 18 allocates the control information on the one device to another device based on those pieces of information using the device grouper 14, thereby reforming the two control information as the same device group control information.

The numerical operator 19 performs a numerical operation using the control information set formed by the data reformer 18.

Figure 11:
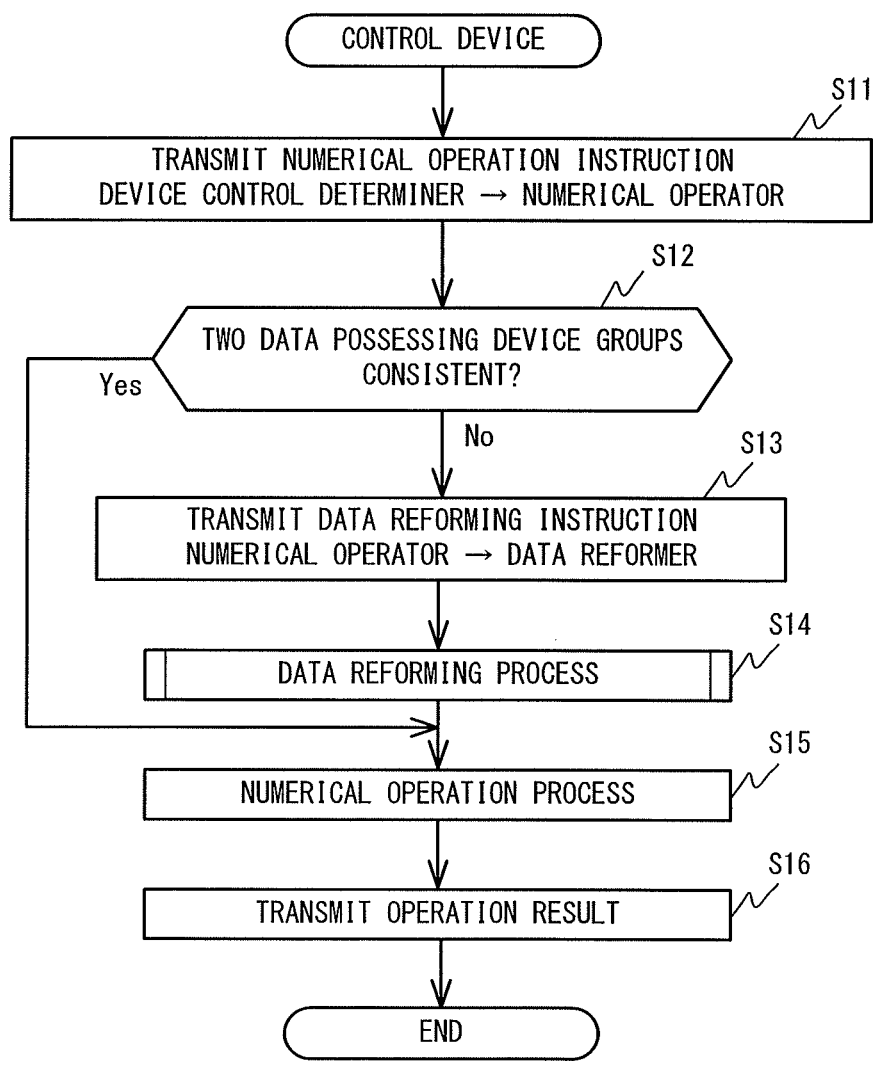
FIG. 11 is a flowchart illustrating an operation of the control device.

FIG. 11 illustrates an operation when the control device 1 performs a numerical operation.

In this case, it is presumed that like the control device 1 of the first embodiment, the device control determiner 11 possesses mapping data of control information for the two different device groups transmitted from the information collective obtainer 13, and a device ID set indicating the data possessing device group of such control information.

In addition, it is presumed that like the first embodiment, the air conditioning system 100 employs the configuration illustrated in FIG. 1. Still further, it is presumed that each facility device possesses control information illustrated in FIG. 13. In this case, an explanation will be given of a case in which the device control determiner 11 transmits an operation instruction that is {(suctioning temperature of indoor unit group)–(set temperature of remote controller group)} to the numerical operator 19.

FIG. 14 illustrates data contained in the numerical operation instruction, intermediate data, and formed data.

As illustrated in FIG. 11, first, the device control determiner 11 transmits the numerical operation instruction to the numerical operator 19 (step S11). As illustrated in FIG. 14, the numerical operation instruction contains first control information D1, a data possessing device group G1 of the first control information, second control information D2, a data possessing device group G2 of the second control information, a connection relationship kind from the second data possessing device group to the first data possessing device group, and a numerical operation order. That is, as illustrated in FIG. 14, D1={25, 26, 27, 28}, G1={5a, 5b, 5c, 5d}, D2={24, 23, 25}, G2={6a, 6b, 6c}, connection relationship (connection relationship kind) from G2 to G={2. closest indoor unit}, and numerical operation order={D1–D2}.

Next, the numerical operator 19 that has received the numerical operation instruction determines whether or not the first data possessing device group and the second data possessing device group are the same (step S12). When the two device groups are the same group (step S12; Yes), the two control information are already in the same format, and thus the control device 1 progresses the process to step S15.

When the two device groups are different groups (step S12; No), the numerical operator 19 transmits a data reforming instruction to the data reformer 18 (step S13). The data reforming instruction contains, in the data contained in the numerical operation instruction, the control information D1, D2, the first and second data possessing device groups G1, G2, and the connection relationship (connection relationship kind) from the data possessing device group G2 to the data possessing device group G1.

Next, the data reformer 18 performs a data reforming process (step S14). The data reforming process is a process of reforming the second control information D2 that is data in the format for the data possessing device group G2 into reformed control information set that is data in the format for the data possessing device group G1.

Figure 12:
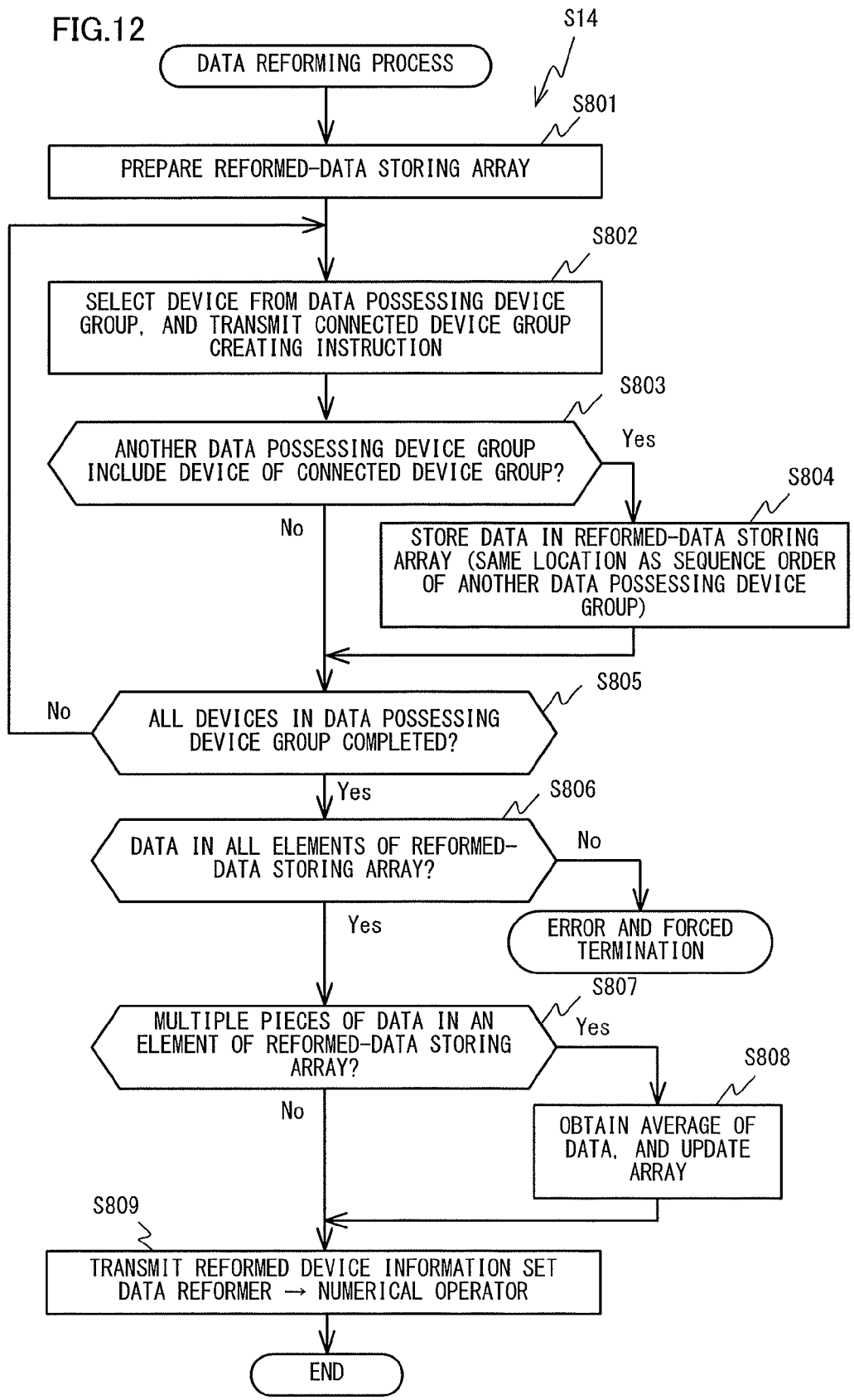
FIG. 12 is a flowchart of a data forming process.

FIG. 12 illustrates a flowchart of the data reforming process. As illustrated in FIG. 12, first, the data reformer 18 prepares a reformed-data storing array (step S801). At this time, the reformed-data storing array is an empty array having the equal number of elements to that of the data possessing device group G1. In this case, the number of elements of the reformed-data storing array is four.

The data reformer 18 transmits, to the device grouper 14, the connected device group creating instruction for the first device in the second data possessing device group G2 to the device grouper 14 (step S802). In this case, the connected device group indicates the device ID set satisfying a connection relationship with a specified reference device. The connected device group creating instruction contains the reference device ID and the connection relationship. In this case, the reference device ID=6a, and the connection relationship=2. the closest indoor unit.

The procedure of creating the device ID set satisfying the connection relationship by the device grouper 14 is the same as that of the operation (see step S2) of the first embodiment. In this case, as illustrated in FIG. 14, when the reference device is 6a, a connected device group G3={5a} that is the device group satisfying the connection relationship is obtained.

Subsequently, the data reformer 18 that has received the connected device group G3 determines whether or not the first data possessing device group G1 contains the first device in the connected device group (step S803). When the first device is contained (step S803; Yes), the data reformer 18 stores data in the reformed-data storing array (step S804). In this case, the first data of the second control information D2 is stored in the prepared reformed data storing array D3. At this time, it is presumed that the location in the array where the data is stored is the same location as the array order in the first data possessing device group G1 of the searched device. In this case, the first device 5a in the connected device group G3 is the first element in the first data possessing device group G1. Therefore, the data reformer 18 stores the first element of the second control information D2 that is 24 in the first location in the reformed-data storing array.

Conversely, when the first device is not contained (step S803; No), or after executing the process of the step S804, the data reformer 18 determines (step S805) whether or not the process is performed on all devices in the data possessing device group. In this way, the steps S802→S803 (→S804) are performed on all devices in the second data possessing device group G2.

In this case, when the connected device group contains multiple devices in the step S804, the corresponding second control information D2 is stored for the multiple elements in the reformed-data storing array. For example, a connected device group G4 of the second device 6b in the second data possessing device group G2 is {5b, 5c}. In this case, the second element of the second control information D2 that is 23 is stored in the second and third elements of the reformed-data storing array.

When the process on all devices in the data possessing device group completes (step S805; Yes), the data reformer 18 determines whether or not all elements of the reformed-data storing array are filled with data (step S806). When all elements are not filled with the data (step S806; No), an operation is not executable with the reformed data, and thus the data reformer 18 returns an error signal to the numerical operator 19.

When all elements are filled with data (step S806; Yes), the data reformer 18 determines whether or not multiple data are allocated to one element in the reformed-data storing array (step S807). When multiple data are allocated (step S807; Yes), the data reformer 18 obtains an average of the pieces of data allocated to the same array order, and updates the content of the reformed-data storing array (step S808).

When the multiple data are not allocated (step S807; No), or after executing the process of the step S808, the data reformer 18 transmits, as reformed control information set D3, data stored in the reformed-data storing array to the numerical operator 19 (step S809), in this case, as illustrated in FIG. 14, the reformed control information set D3 is {24, 23, 23, 25}.

Returning to FIG. 11, the numerical operator 19 that has received the reformed control information set D3 performs a specified operation on the first control information D1 and the reformed control information set D3 (step S15). In this case, as illustrated in FIG. 14, since a numerical operation order that is {D1−D2} is specified, the operation to be actually carried out is {D1−D3}, and an operation result D4 becomes {1, 3, 4, 3}.

Subsequently, the numerical operator 19 transmits the operation result D4 to the device control determiner 11 (step S16). The device control determiner 11 decides the content of control based on the obtained operation result D4. The device control determiner 11 transmits the device control instruction based on the decided control content to the communicator 17. The communicator 17 transmits a command obtained upon conversion on the control content to the air conditioner, thereby operating the air conditioner.

As explained above, according to this second embodiment, when an operation process is performed on the control information of two different device groups, information for the one device group is reformed in the format for another device group. The term format means a number of elements in an array and a layout of respective elements. When the formats of the two control information are unified, operations, such as addition, subtraction, and comparison, can be described as an operation process between simple group information.

Third Embodiment

Next, an explanation will be given of a third embodiment of the present disclosure.

Figure 15:
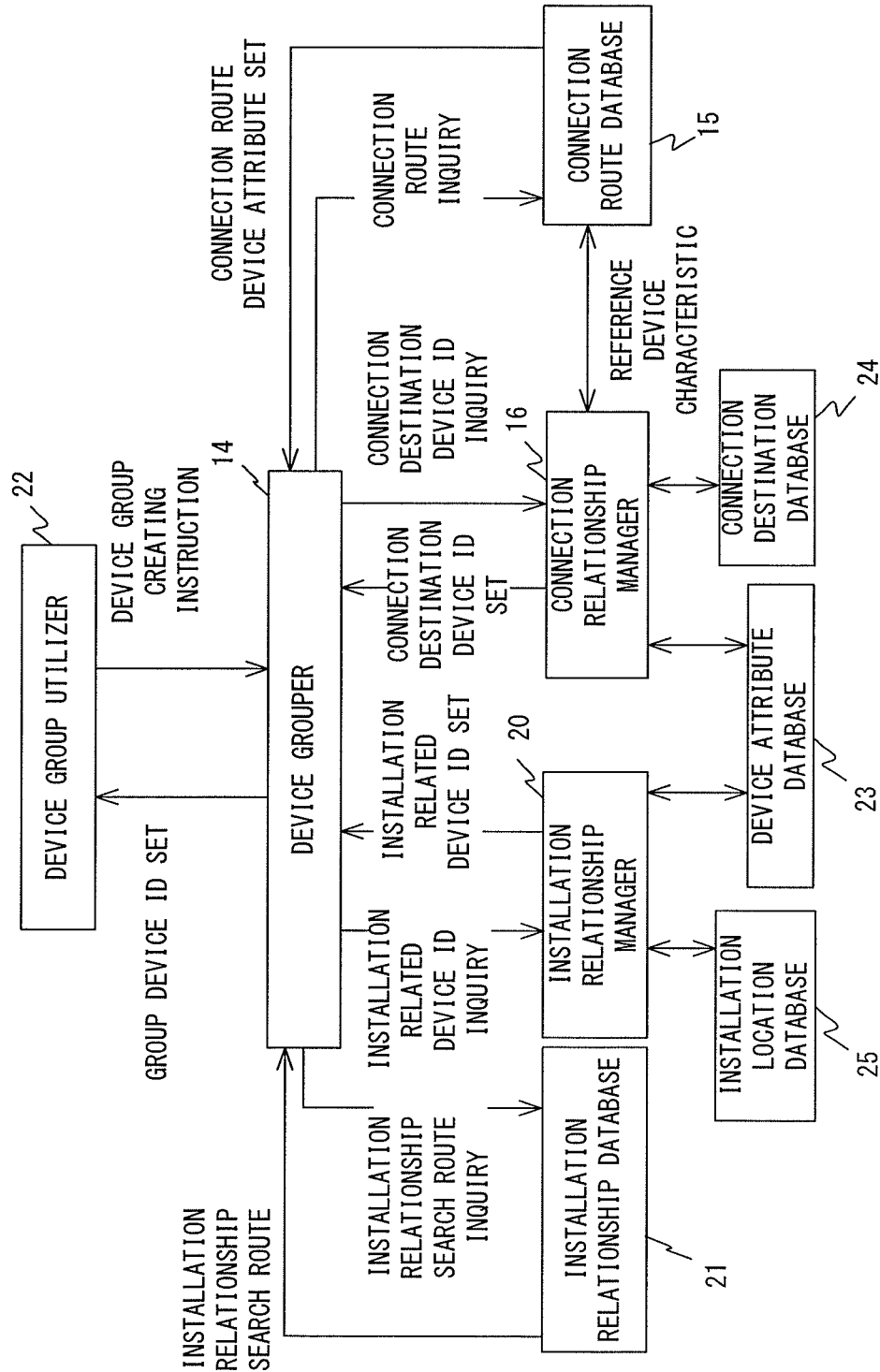
FIG. 15 is a block diagram illustrating a detailed configuration of a control device according to a third embodiment of the present disclosure.

FIG. 15 illustrates, in the configuration of the control device 1 of the third embodiment, a configuration relating to a device grouping function. As illustrated in FIG. 15, this embodiment employs the device grouper 14, the connection route database 15, the connection relationship manager 16, the device attribute database 23, and the connection destination database 24 like the control devices 1 of the first and second embodiments. In FIG. 15, however, although the device attribute database 23 and the connection destination database 24 are illustrated as being provided outside the connection relationship manager 16, those databases may be provided therein. The control device 1 further includes an installation relationship manager 20, an installation relationship database 21, and an installation location database 25.

A device group utilizer 22 receives and utilizes the device group created by the device grouper 14. The device grouping utilizer 22 corresponds to the information collective obtainer 13, the device data mapper 12, and the data reformer 18 of the first and second embodiments.

The installation relationship manager 20 manages information on relationships between multiple facility devices and the installation locations thereof.

FIG. 16 illustrates an example of data registered in the installation location database 25. As illustrated in FIG. 16, the installation location database 25 registers the device ID, an instillation room ID, and an installation area number in association with one another. The device ID is identification information of the facility device. The installation room ID is identification information indicating a room where the device is installed. An installation area is information indicating a segment of a room divided into equal to or greater than one segment. The installation area number is information indicating the location in the room where the device is installed. That is, the installation location database 25 registers the multiple facility devices and the installation locations thereof in association with each other.

FIG. 18 illustrates an example of data registered in the installation relationship database 21. As illustrated in FIG. 18, the installation relationship database 21 registers an installation relationship number and an installation relationship route in association with each other. The installation relationship number is a number allocated to each positional relationship of the installation location that will be a condition for grouping. The installation relationship route is information indicating a searching route to search the installation location database 25, the connection destination database 24, and the device attribute database 23 when an facility device satisfying a specified installation relationship is searched. In other words, the installation relationship route (search route) is a route formed of a connection between the installation location and an installed device. That is, the installation relationship database stores, in association with each other, a condition for grouping relating to the positional relationship of the installation location and information indicating a search route for searching an facility device satisfying the aforementioned condition.

The device grouper 14 inquires the equipment relationship manager 25 about the facility devices satisfying a condition of grouping, and groups the facility devices based on the condition of grouping related to an installation and based on the search route read from the installation relationship database 21.

Next, an explanation will be given of an operation of the control device 1 according to this embodiment.

Figure 19:
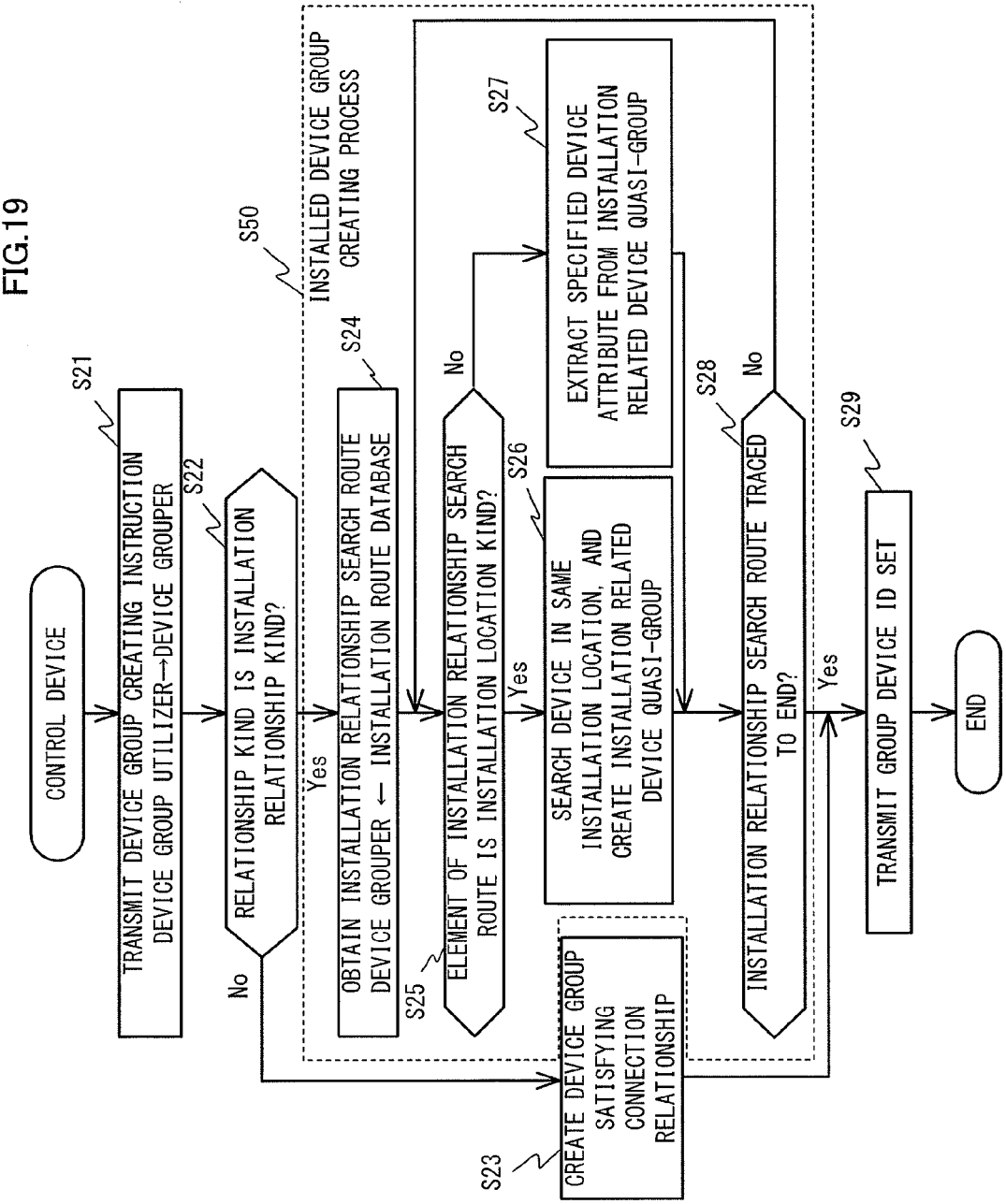
FIG. 19 is a flowchart illustrating an operation when the control device performs grouping on devices.

FIG. 19 illustrates an operation when the control device 1 performs grouping on the devices. In this embodiment, also, the explanation will be given of the air conditioning system 100 in FIG. 1.

Figure 17:
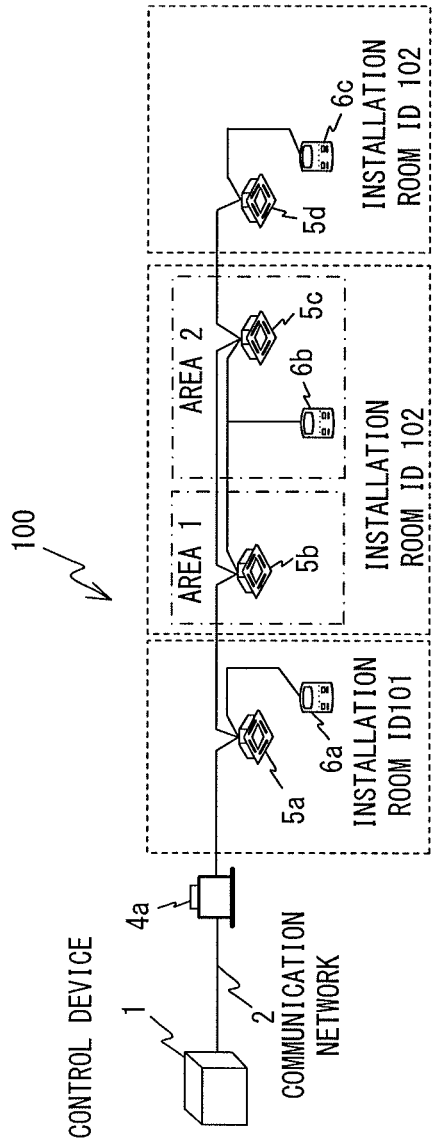
FIG. 17 is an example of diagram illustrating a general configuration of an air conditioning system according to the third embodiment of the present disclosure.

FIG. 17 illustrates a part of the air conditioning system 100 in FIG. 1. As illustrated in FIG. 17, the indoor unit 5a and the remote controller 6a are installed in a room with 101 as an installation room ID. The indoor units 5b, 5c and the remote controller 6b are installed in a room with 102 as an installation room ID. The indoor unit 5d and the remote controller 6c are installed in a room with 102 as an installation room ID. The indoor unit 5b is installed in an area 1, and the indoor unit 5c and the remote controller 6b are installed in an area 2.

In this embodiment, an explanation will be given of a case in which the device group utilizer 22 transmits a group creating instruction such that "create an indoor unit group installed in the same installation room as the indoor unit 5b" to the device grouper 14.

First, the device group utilizer 22 transmits a device group creating instruction to the device grouper 14 (step S21). The device group creating instruction contains the reference device ID and the relationship kind. The relationship kind indicates either one of the connection relationship or the installation relationship. In this case, the reference device ID=5b, and the relationship kind={100. indoor unit in the same installation room}. That is, the relationship kind indicates the installation relationship.

The device grouper 14 that has received the device group creating instruction determines whether or not the relationship kind in the device group creating instruction is the installation relationship kind (connection relationship kind) (step S22). In this embodiment, when the relationship kind number is 0 to 99, it indicates the connection relationship kind, and when the relationship kind number is equal to or over 100, it indicates the installation relationship kind. In this case, the relationship kind=100, and thus it is determined that the relationship kind indicates the installation relationship kind.

When the relationship kind is not the installation relationship kind (step S22; No), the device grouper 14 creates the device group satisfying the specified connection relationship from the reference device through the same operations (operations indicated by the steps S205, S206, and S207 in FIG. 8) as those of the first embodiment (step S23).

When the relationship kind is the installation relationship kind (step S22; Yes), the device grouper 14 performs an installation related device group creating process (step S50) as explained below.

First, the device grouper 14 obtains an installation relationship search route from the installation relationship database 21 (step S24). More specifically, first, the device grouper 14 transmits an installation relationship search route inquiry to the installation relationship database 21. The installation relationship search route inquiry contains the installation relationship number (see FIG. 18). The installation relationship database 21 replies the installation relationship search route corresponding to the installation relationship number to the device grouper 14. In this case, the replied installation relationship search route is {installation room ID→indoor unit ID in the room}.

Subsequently, the device grouper 14 creates the installation related device group while inquiring the installation location manager 20 about the installation location information using the installation relationship search route.

More specifically, the device grouper 14 determines whether or not the element of the installation relationship search route is the installation location kind (device attribute) (step S25).

When the element of the installation relationship search route is the installation location kind (step S25; Yes), the device grouper 14 searches the device in the same installation location, and creates an installation related device quasi-group (step S26). More specifically, the device grouper 14 transmits an installation related device ID inquiry to the installation relationship manager 20. The installation related device ID inquiry contains the reference device ID and the installation relationship search route. The installation relationship manager 20 that has received the installation related device ID inquiry searches the installation location database 25, and sends back an installation related device ID set that is a device ID set of devices in the same installation location as that of the reference device. The device grouper 14 that has received the installation related device ID set creates an installation related device quasi-group.

In this case, the installation related device quasi-group is a device group that will be intermediate data created during a process of creating an installation related device quasi-group through a search route. When an installation related device ID inquiry is transmitted to the reference device, the installation related device ID set replied by the installation relationship manager 20 becomes the installation related device quasi-group. When the installation related device ID inquiry is made to each device in the installation related device quasi-group, the installation related device ID set for all devices is reformed into an array, and a redundancy is eliminated, which will be the installation related device quasi-group.

When the element of the installation relationship search route is not the installation location kind but is the device attribute (step S25; No), the device grouper 14 extracts the element of the specified device attribute (step S27). More specifically, the device grouper 14 transmits the device attribute inquiry to the installation relationship manager 20 for each element of the installation related device quasi-group. The device attribute inquiry contains the device ID. The installation relationship manager 20 that has received the device attribute inquiry searches the device attribute database 23, and replies the device attribute corresponding to the device ID. Only when the device attribute received from the received installation relationship manager 20 is consistent with the device attribute of the element in the installation relationship search route, the device grouper 14 leaves such an element in the installation related device quasi-group, and eliminates the others.

After executing the step S26 or step S27, the device grouper 14 determines whether or not the installation relationship search route is traced to the end (step S28). When the installation relationship search route is not traced to the end (step S28; No), the device grouper 14 returns the process to the step S25.

Thereafter, the device grouper 14 repeatedly performs the process in the step S26 or the step S27 on all elements in the array of the installation relationship search route. The installation related device quasi-group obtained after the installation relationship is traced to the end becomes the installation related device group.

In this case, the first element {installation room ID} of the installation relationship search route is the installation location kind, and thus the devices in the same installation room as the reference device {5*b*} are searched from the installation location database 25. As a result, the installation related device quasi-group becomes {5*b*, 5*c*, 6*b*}. Next, the second element {indoor unit ID in the room} is the device attribute, and thus only the indoor unit is extracted from the installed device quasi-group, and the installation related device quasi-group becomes {5*b*, 5*c*}. This becomes the final installation related device group.

When it is determined that the installation relationship search route is traced to the end (step S28; Yes), or after executing the step S23, the device grouper 14 transmits the group device ID set of the created installation related device group to the device group utilizer 22 (step S29).

As explained above, the device grouper 14 searches, when the element of the search route read from the installation relationship database 21 indicates an installation location, the facility device in that installation location, and creates the installation related device quasi-group. Next, the device grouper 14 leaves, when the element of the search route read from the installation relationship database 21 indicates the attribute of the facility device, only the element matching such an attribute in the installation related device quasi-group. Still further, the device grouper 14 groups the facility device contained in the installation related device quasi-group at a time point at which the search route is traced to the end.

Moreover, the device grouper 14 performs, when the received group creating instruction indicates a grouping based on the connection relationship of the facility devices, grouping based on the connection relationship of the facility devices. Conversely, when the group creating instruction indicates a grouping based on the relationship of the installation locations of the facility devices, the device grouper 14 performs grouping based on the installation relationship of the facility devices.

As explained above, according to this third embodiment, a device group is created based on, in addition to the connection relationship through a refrigerant pipe, a network, and a power line, information on the installation location. According to this scheme, the way of unification of the devices when the device group is created can have various options, and thus a flexible control algorithm can be set up.

In addition, in the case of building tenants like an office, the segmentation of rooms and the layout thereof are relatively frequently changed. However, it becomes possible to cope with such a change by only correcting a database collecting information of the installation locations at that time, thus easy to cope with a layout change.

As to the installation location database 25, the installation relationship database 21, and the installation location database 25, data created manually may be input in advance, or data may be set changeable through an external input using, for example, a personal computer (PC). The respective aforementioned databases have the registered contents updatable through an external device as explained above.

Still further, according to the respective aforementioned embodiments, no diverging controller or no central managing controller is provided, but those may be provided. In this case, the diverging controller or the central managing controller may be included objects controlled by the control device 1.

In the respective aforementioned embodiments, the control-target facility devices are air conditioners, but the present disclosure is not limited to this case, and the control target may be other facility devices, such as a lighting device and home electronics.

The program executed in the aforementioned embodiments may be stored in a computer-readable non-transitory recording medium, such as a flexible disk, a CD-ROM (Compact Disc Read-Only Memory), a DVD (Digital Versatile Disc), or an MO (Magneto-Optical Disc), distributed and installed to configure a system executing the above-explained threads.

Moreover, the program may be stored in a disk device or the like of a predetermined server device over a communication network like the Internet, and may be downloaded in a manner superimposed on, for example, carrier waves.

When the above-explained functions are realized in a manner shared by an OS (Operating System) or realized by a cooperative operation by the OS and an application, only portions other than the OS may be stored in a medium and distributed, or may be downloaded, for example.

The present disclosure can permit various embodiments and modifications thereof without departing from the broadest scope and spirit of the present disclosure. The above-explained embodiments are to explain the present disclosure, and are not intended to limit the present disclosure. That is, the scope and spirit of the present disclosure are indicated by the appended claims rather than the embodiments, Various modifications carried out within the scope of the appended claims and the equivalent range thereto should be within the scope and spirit of the present disclosure.

INDUSTRIAL APPLICABILITY

When the present disclosure is applied, it becomes possible to easily and flexibly set the control algorithm for air conditioners. That is, the present disclosure is useful as a control device that controls air conditioners and a control system including the same. When, for example, the present disclosure is applied, a work time and a setting error can be reduced when the air conditioning control algorithm is changed to an algorithm with an excellent energy saving performance, or when a control method is changed in association with a floor layout change in a building.

REFERENCE SIGNS LIST

1 Control device
2 Communication network
4a, 4b Outdoor unit
5a, 5b, 5c, 5d, 5e, 5f, 5g, 5h Indoor unit
6a, 6b, 6c, 6d, 6e, 6f Remote controller
11 Device control determiner
12 Device data mapper
13 Information collective obtainer
14 Device grouper
15 Connection route database
16 Connection relationship manager
17 Communicator
18 Data reformer
19 Numerical operator
20 Installation relationship manager
21 Installation relationship database
22 Device group utilizer
23 Device attribute database
24 Connection destination database
25 Installation location database
100 Air conditioning system

The invention claimed is:

1. A control device that controls a plurality of facility devices, the control device comprising:
 a communicator that receives control information from each of the plurality of facility devices;
 a control determiner that outputs a control information request for collectively obtaining pieces of the control information, the control information request containing a condition of the facility devices to be included in a possessing device group possessing the control information, and a kind of the control information;
 a connection relationship manager that manages information on a connection relationship among the plurality of facility devices;
 a connection route database that stores information on a connection route from a reference device in the plurality of facility devices to another facility device;
 a device grouper that creates the possessing device group based on the control information request, the connection route database, and information managed by the connection relationship manager; and
 an information collective obtainer that creates a data array of the control information received by the communicator from the facility device in the possessing device group, wherein:
 the connection route database stores a condition on a connection relationship, an attribute of the reference device, and a sequence order of an attribute of the facility device from the reference device in association with one another, the sequence order being information on the connection route;
 the control information request contains, as the condition of the facility devices to be included in the possessing device group, a connection relationship between the reference device and the facility devices to be included in the possessing device group;

the device grouper traces the sequence order of the attribute of the connection route obtained from the connection route database based on the connection relationship contained in the control information request to specify the facility device to be included in the possessing device group;

the control information request further contains a condition of the facility devices to be included in a managed device group to be managed;

the control device further comprises a data mapper that allocates an element of a data array of the control information created by the information collective obtainer to any of the facility devices in the managed device group to create a control information set and outputs the created control information set to the control determiner;

the device grouper creates the managed device group and the possessing device group having the facility device in the managed device group as the reference device based on the control information request, the connection route database, and information managed by the connection relationship manager; and the control determiner controls the reference device based on the control information set created by the data mapper.

2. The control device according to claim 1, wherein:

the connection relationship manager:
 comprises a connection destination database in which an attribute of each the facility device and an attribute of the facility device directly connected with the each facility device are associated with each other; and
 returns the attribute of the facility device directly connected to the facility device inquired by the device grouper by referring to the connection destination database; and the device grouper traces a sequence order of an attribute of the connection route based on the attribute of the facility device returned from the connection relationship manager.

3. The control device according to claim 1, wherein the connection route database includes a stored content updatable through an external device.

4. The control device according to claim 1, wherein when plural pieces of control information are allocated to any one of the facility devices in the managed device group, the data mapper allocates, as the control information of the facility device to which the plural pieces of control information are allocated, a representative value of the plural pieces of control information or a calculated value obtained by calculating the plural pieces of control information allocated.

5. The control device according to claim 1, further comprising:

a numerical operator that performs a numerical operation based on the control information of the two possessing device groups received from the control determiner, and an operation instruction, and that returns the operation result to the control determiner; and a data reformer that reforms the control information of the one possessing device group in such a way that the connection relationship of the facility device corresponding to each element of the control information of the possessing device group satisfies a predetermined condition, wherein the numerical operator performs the numerical operation using the control information reformed by the data reformer.

6. The control device according to claim 5, wherein the data reformer:

causes the device grouper to create a connected device group in a predetermined connection relationship with the facility device in the one possessing device group; and when the other possessing device group contains the facility device of the connected device group, stores the control information in a same location in an array as a sequence order of the facility device in the other possessing device group to create an array of the control information of the one possessing device group.

7. The control device according to claim 1, further comprising:

an installation relationship database that stores a grouping condition related to a positional relationship of installation locations, and information indicating a search route to search the facility device satisfying the grouping condition in association with each other; and an installation relationship manager that manages information on a relationship between the plurality of facility devices and installation locations thereof, wherein the grouper groups the facility device satisfying the grouping condition based on the installation relationship database and information managed by the installation relationship manager.

8. The control device according to claim 7, wherein:

the search route is a route formed by a connection between the installation location and the facility device; and the device grouper:
 searches, when an element of the search route associated with the grouping condition in the installation relationship database indicates an installation location, the facility device located at the installation location, and creates an installation related device quasi-group;
 leaves, when the element of the search route associated with the grouping condition in the installation relationship database indicates an attribute of the facility device, only the element matching the attribute in the installation related device quasi-group; and
 groups the facility devices included in the installation relationship device quasi-group at a time point at which the search route is traced to an end.

9. The control device according to claim 7, wherein the device grouper:

performs grouping based on a connection relationship of the facility device upon receiving a group creation instruction of grouping based on the connection relationship of the facility device; and performs grouping based on an installation relationship of the facility device upon receiving a group creation instruction of grouping based on the installation relationship of the facility device.

10. An air conditioning system comprising:
the control device according to claim 1; and
a plurality of air conditioners controlled by the control device.

11. An equipment system comprising:
the control device according to claim 1; and
a plurality of facility devices controlled by the control device.

12. A control method for a control device to control a plurality of facility devices, comprising:
- outputting a control information request for collectively obtaining a specific kind of pieces of the control information from the plurality of facility devices, the control information request containing a condition of the facility devices to be included in a possessing device group possessing the control information;
- creating the possessing device group based on the control information request, information on a connection route from a reference device in the plurality of facility devices to another facility device stored in a connection route database, and information on a connection relationship among the plurality of facility devices;
- obtaining the control information of the facility device in the possessing device group; and
- creating a data array of the obtained control information, wherein:
- the connection route database stores a condition on a connection relationship, an attribute of the reference device, and a sequence order of an attribute of the facility device from the reference device in association with one another, the sequence order being information on the connection route;
- the control information request contains, as the condition of the facility devices to be included in the possessing device group, a connection relationship between the reference device and the facility devices to be included in the possessing device group;
- the possessing device group is created by tracing the sequence order of the attribute of the connection route obtained from the connection route database based on the connection relationship contained in the control information request to specify the facility device to be included in the possessing device group;
- the control information request further contains a condition of the facility devices to be included in a managed device group to be managed;
- the control method further comprises:
  - allocating an element of a data array of the control information to any of the facility devices in the managed device group to create a control information set;
  - outputting the created control information set;
  - creating the managed device group and the possessing device group having the facility device in the managed device group as the reference device based on the control information request, the connection route database, and the information on the connection relationship among the plurality of facility devices; and
  - controlling the reference device based on the created control information set.

13. A non-transitory computer-readable recording medium storing a program, the program causing a computer to:
- output a control information request for collectively obtaining a specific kind of pieces of the control information from the plurality of facility devices, the control information request containing a condition of the facility devices to be included in a possessing device group possessing the control information;
- create the possessing device group based on the control information request, information on a connection route from a reference device in the plurality of facility devices to another facility device stored in a connection route database, and information on a connection relationship among the plurality of facility devices;
- obtain the control information of the facility device in the possessing device group; and
- create a data array of the obtained control information, wherein:
- the connection route database stores a condition on a connection relationship, an attribute of the reference device, and a sequence order of an attribute of the facility device from the reference device in association with one another, the sequence order being information on the connection route;
- the control information request contains, as the condition of the facility devices to be included in the possessing device group, a connection relationship between the reference device and the facility devices to be included in the possessing device group;
- the possessing device group is created by tracing the sequence order of the attribute of the connection route obtained from the connection route database based on the connection relationship contained in the control information request to specify the facility device to be included in the possessing device group;
- the control information request further contains a condition of the facility devices to be included in a managed device group to be managed;
- the program further causing a computer to:
  - allocate an element of a data array of the control information to any of the facility devices in the managed device group to create a control information set;
  - output the created control information set;
  - create the managed device group and the possessing device group having the facility device in the managed device group as the reference device based on the control information request, the connection route database, and the information on the connection relationship among the plurality of facility devices; and
  - control the reference device based on the created control information set.

* * * * *